(12) United States Patent
Perisic et al.

(10) Patent No.: US 8,566,778 B2
(45) Date of Patent: Oct. 22, 2013

(54) USING ENTERPRISE MANAGEMENT APPLICATION PROXIES FOR DEVELOPING PROJECTS IN PROGRAM DEVELOPMENT TOOLS

(75) Inventors: Marko Perisic, Birkeroed (DK); Lukasz Zoglowek, Gentofte (DK); Vincent Nicolas, Vaerloese (DK)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/152,698

(22) Filed: Jun. 3, 2011

(65) Prior Publication Data

US 2012/0311521 A1 Dec. 6, 2012

(51) Int. Cl.
G06F 9/44 (2006.01)
(52) U.S. Cl.
USPC ........... 717/102; 709/203; 717/106; 717/108; 719/310; 719/330
(58) Field of Classification Search
None
See application file for complete search history.

(56) References Cited

U.S. PATENT DOCUMENTS

| | | | |
|---|---|---|---|
| 6,038,395 A | 3/2000 | Chow et al. | |
| 6,751,798 B1 * | 6/2004 | Schofield | 719/330 |
| 7,162,721 B2 * | 1/2007 | Ali et al. | 719/310 |
| 7,171,672 B2 | 1/2007 | Just | |
| 7,725,873 B2 | 5/2010 | Shepard et al. | |
| 7,788,496 B2 | 8/2010 | Lelikov et al. | |
| 7,895,568 B1 * | 2/2011 | Goodwin et al. | 717/108 |
| RE43,375 E * | 5/2012 | Glass | 709/203 |
| 2004/0177335 A1 * | 9/2004 | Beisiegel et al. | 717/102 |
| 2008/0127055 A1 * | 5/2008 | Davis et al. | 717/106 |
| 2010/0318957 A1 * | 12/2010 | Akkiraju et al. | 717/102 |
| 2010/0333060 A1 * | 12/2010 | Kirchgaessner et al. | 717/102 |

OTHER PUBLICATIONS

Erlend Dalen, "Microsoft Dynamics AX 2009 Programming: Getting Started", PACKT, 2009, pp. 1-347 <http://msdax.files.wordpress.com/2009/12/microsoft-dynamics-ax-2009-programming-getting-started.pdf>.*

Alvin T.S. Chan, "Distributed object programming environment for smart card application development", 2001, The Hong Kong Polytechnic University, pp. 251-259, <http://ieeexplore.ieee.org/stamp/stamp.jsp?tp=&arnumber=954090&tag=1>.*

Jim Boyle, "Providing a Web-based view of your managed network", 1997, The MITRE Corporation, pp. 849-898, <http://ieeexplore.ieee.org/stamp/stamp.jsp?tp=&arnumber=610008&tag=1>.*

(Continued)

Primary Examiner — Thuy Dao
Assistant Examiner — Khanh Dang
(74) Attorney, Agent, or Firm — Turk IP Law, LLC

(57) ABSTRACT

An integrated system may provide seamless project management for developing for an Enterprise Management Application (EMA) using a Program Development Application (PDA). The integrated system may align the EMA development experience with the development experience of using the PDA's toolset, and may deliver the capability of developing Enterprise Management projects working off of the PDA's infrastructure through proxy items. Proxy items may be generated to represent programmable objects from the Application Object Server (AOS) in the EMA for use in the PDA toolset and may appear as managed code artifacts for programming in the PDA. Proxy items may include the unique identifier linking the proxy item in the PDA toolset to its specific location in the AOS. As changes are made in PDA, the proxy items and the code behind them may be saved to the EMA in the location specified by the unique identifier.

20 Claims, 7 Drawing Sheets

(56) References Cited

OTHER PUBLICATIONS

Paolo Anedda, "Network Administration Using Web Services", 2009, University of Cagliari, pp. 1-6, <http://ieeexplore.ieee.org/stamp/stamp.jsp?tp=&arnumber=5425526>.*

Lames Won-Ki Hong, "Web-based intranet services and network management", 1997, Kyungpook National University, pp. 100-110, <http://ieeexplore.ieee.org/stamp/stamp.jsp?tp=&arnumber=623993>.*

Sharma, Rahul, "Call your Ax customization from Visual Studio C# code", Retrieved at<<http://community.dynamics.com/product/ax/axtechnical/b/axfortechies/archive/2010/04/02/call-your-ax-customization-from-visual-studio-c-code.aspx>>, Apr. 2, 2010, pp. 2.

"How to: Set Up and Configure a Proxy User for Microsoft Dynamics AX", Retrieved at<<http://msdn.microsoft.com/en-us/library/cc602654.aspx>>, Retrieved Date: Mar. 7, 2011, pp. 3.

"What's New in Microsoft Dynamics AX 2009 for Developers", Retrieved at<<http://msdn.microsoft.com/en-us/library/cc602654.aspx>>, Retrieved Date: Mar. 7, 2011, pp. 15.

"Report Integration and Customization Overview [AX 2012]", Retrieved at <<http://msdn.microsoft.com/en-us/library/cc519490(d=printer), Oct. 12, 2011, pp. 2.

* cited by examiner

USING ENTERPRISE MANAGEMENT APPLICATION PROXIES FOR DEVELOPING PROJECTS IN PROGRAM DEVELOPMENT TOOLS

BACKGROUND

Enterprise Management Applications (EMA) and other similar management applications may provide business solutions for creating reports by providing project templates and modeling tools. The applications may operate over a Web-based framework that allows for users to interact with data in the Enterprise Management Application through a Web browser. A user may create new content for the EMA, and also modify existing content. In an Enterprise Management Application, program development and modification may typically be accomplished using the application's own integrated development environment, which resides in the EMA. Most additions and changes can be made with resources in an Application Object Server (AOS) contained in the EMA and using the Integrated Development Environment (IDE). More advanced applications and modifications can be created by using separate Program Development Applications (PDA) that are specifically designed for providing a platform for programming of projects and applications. Some Enterprise Management Applications may be configured to allow for some development and modification of programs, projects, and applications using separate PDA's, however, the applications are not typically integrated together or synchronized, and programming and development for EMAs in separate Program Development Applications may consequentially be cumbersome and inconvenient.

Generally, in order to program for a separate application using a Program Development Application, program language compatible with the EMA may be copied by a user from the command line in the EMA and pasted into a command window in the PDA for design and modification of EMA projects. Bulk generating the code (e.g. X++ or C# code) from the command line and including it into a PDA project may be time consuming and inefficient, and may produce copying mistakes which generate errors in code language. Additionally, a user must constantly go back and forth between the applications, and manually copy the bulk generated code into the PDA whenever changes, additions, and modifications are made to the code so that the code is consistently updated with new changes. In some cases, the necessity to constantly go back and forth and ensuring to copy the latest updated code for use in the project may cause an earlier version to be used if the latest version is not copied into the project before modifications are made.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an integrated system providing seamless project management for developing an Enterprise Management Application (EMA) using a Program Development Application (PDA). The integrated system may align the EMA development experience with the development experience of using the PDA's toolset, and may deliver the capability of developing Enterprise Management projects working off of the PDA's infrastructure through proxy items. Proxy items may be generated to represent programmable objects from the Application Object Server (AOS) in the EMA for use in the PDA toolset and may appear as managed code artifacts for programming in the PDA. Proxy items may include the unique identifier linking the proxy item in the PDA toolset to its specific location in the AOS. As changes are made in PDA, The code behind may be generated whenever necessary. The proxy item in the project system merely represents an indication to the PDA build to generate the appropriate code. As a consequence, if changes are made in the AOS, the code is automatically regenerated and updated next time the PDA builds the EMA.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
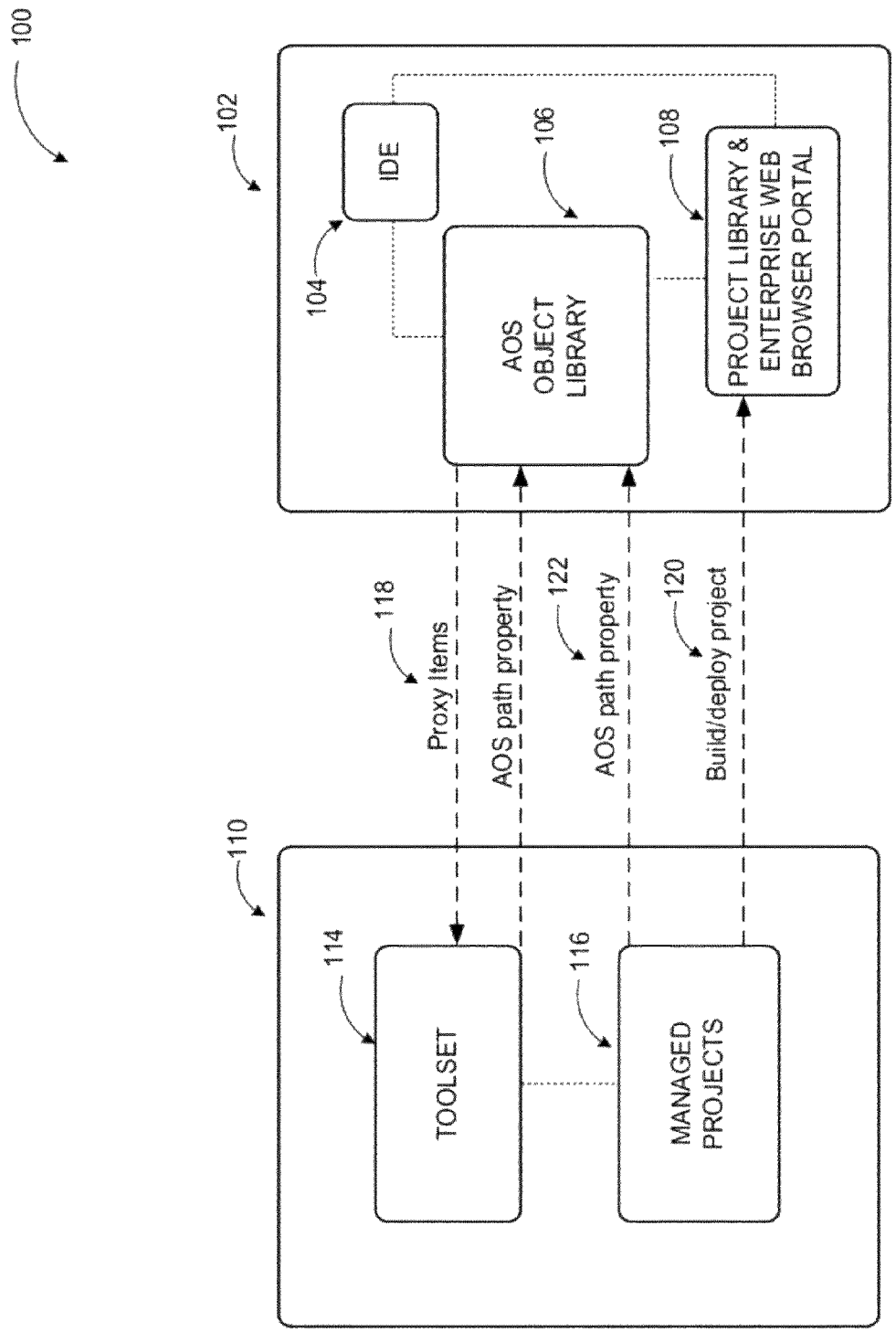
FIG. 1 demonstrates an example embodiment of an integrated system for seamless project management, according to embodiments.

As briefly described above, an integrated system may provide seamless project management for an Enterprise Management Application (EMA) using a separate Program Development Application (PDA). The integrated system may align the EMA development experience with the PDA development experience using the PDA's toolset, and may deliver the capability of developing Enterprise Management projects working off of the PDA's infrastructure through the use of proxy items. Proxy items may be generated to represent programmable objects from the Application Object Server (AOS) in the EMA for use in the PDA toolset and may appear as managed code artifacts for programming in the PDA. Proxy items may include the unique identifier linking the proxy item in the PDA toolset to its specific location in the AOS. As changes are made in PDA, the proxy items and the code behind them may be saved to the EMA in the location specified by the unique identifier such as an AOS path property.

The following detailed description is therefore not to be taken in a limiting sense, and the scope of the present invention is defined by the appended claims and their equivalents.

While the embodiments will be described in the general context of program modules that execute in conjunction with an application program that runs on an operating system on a server or similar computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing proxy items in an integrated system for seamless project management. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

In an Enterprise Management Application (EMA), program development and modification may typically be accomplished using the application's own integrated development environment, which resides in the EMA. Most additions and changes can be made with resources in an Application Object Server (AOS) and using the Integrated Development Environment (IDE). More advanced applications and modifications can be created by using separate Program Development Applications (PDA) that are specifically designed for allowing programming of projects and applications. Some Enterprise Management Applications may be configured to allow for some development and modification of programs, projects, and applications using separate PDA's, however the applications are not typically integrated together, and programming and development in separate Program Development Applications may be cumbersome and inconvenient. In order to program for a separate application using a Program Development Application, program language compatible with the EMA may be copied by a user from the command line in the EMA and pasted into a command window in the PDA for design and modification of EMA projects.

Bulk generating the code (e.g. X++ or C# code) from the command line and including it into a PDA project may be time consuming and inefficient, and may produce copying mistakes which generate errors in code language. Additionally, a user may have to constantly go back and forth between the applications, and manually copy the bulk generated code into the PDA whenever changes, additions, and modifications are made to the code so that the code is consistently updated with new changes. In some cases, the necessity to constantly go back and forth and ensuring to copy the latest updated code for use in the project may cause an earlier version to be used if the latest version is not copied into the project before modifications are made.

Referring to FIG. 1, diagram 100 demonstrates an example embodiment of an integrated system for seamless project management, according to embodiments. The integrated system may provide programming capability for Enterprise Management Applications (EMA) 102 using a separate Program Development Application (PDA) framework 110. In a system according to embodiments, the EMA 102 and the PDA framework 110 may be wholly integrated such that the development experience in the EMA is aligned with the development experience of using the PDA toolset. An integrated system may deliver the capability of developing and controlling projects 108 in EMA working off of the PDA infrastructure. Using PDA tools 114, a user may create a managed project for an EMA 102 and may create and edit objects within the project.

An EMA 102 may provide programmatic libraries and other tools and objects, which may be stored in an Application Object Server (AOS) 106, for development within the EMA environment. In the integrated system, the EMA programmatic libraries and objects stored in the AOS 106 may be able to be used in the PDA by integrating the PDA toolset 114 with the EMA toolset through synchronization of the PDA toolset 114 with the AOS library 106. Integrating the PDA toolset 114 with the EMA toolset may be accomplished through the use of proxy items 118. Proxy items 118 may be items that represent objects contained in the AOS 106 within the EMA 102 framework and link the EMA compatible code language with the PDA framework 110, specifying a location in the EMA framework through a specific AOS path property 122 (or any unique identifier) associated with each proxy item. The proxy items 118 may appear in the PDA toolset 114 allowing a user to make use of EMA objects in the PDA environment for managing, creating, and editing a managed project in a PDA. An EMA project that is developed in the PDA framework 110 can subsequently be built and deployed 120 for use in the EMA environment. Thus, the integrated experience delivers the capabilities for creating managed projects for an EMA working off of the PDA infrastructure, creating a seamless design infrastructure for designing, editing, modifying and controlling EMA managed projects in a PDA.

The example systems in FIG. 1 have been described with specific servers, client devices, applications, and interactions. Embodiments are not limited to systems according to these example configurations. A system providing an integrated environment for seamless development and management of Enterprise Management Applications using a Program Development Application infrastructure may be implemented in configurations employing fewer or additional components and performing other tasks. Furthermore, specific protocols and/or interfaces may be implemented in a similar manner using the principles described herein.

Figure 2:
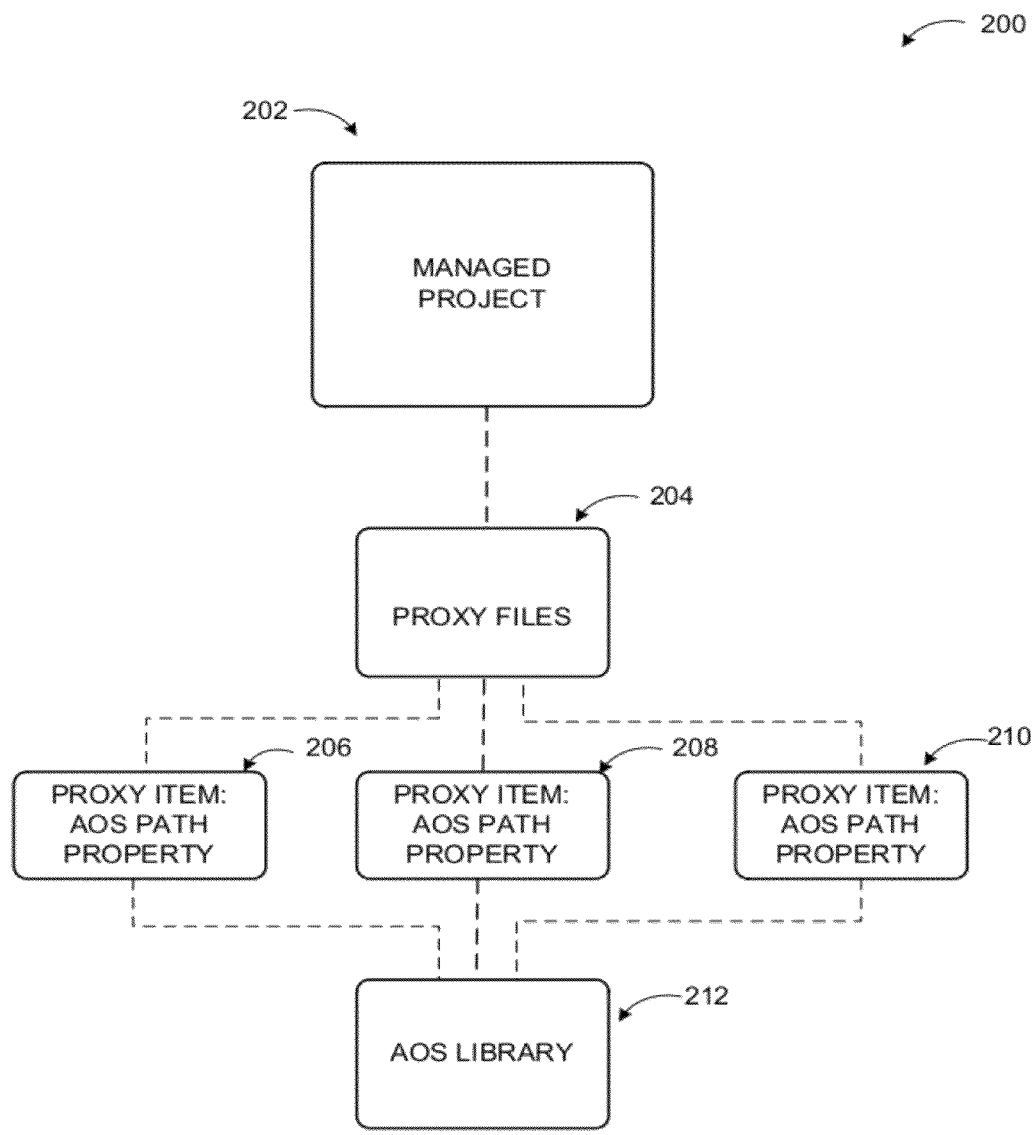
FIG. 2 demonstrates an example managed project in an integrated environment according to embodiments.

FIG. 2 demonstrates an example managed project in an integrated environment according to embodiments. An Enterprise Management Application may include an Application Object Server (AOS) 212 which may contain all of the programmable objects for building in EMA, such as, for example, tables, forms, reports, and classes. In a typical isolated EMA environment, the source code for the objects in the AOS is available and a user may edit the code using an integrated development environment (IDE), which includes tools for designing, editing, compiling, and debugging code in the EMA. Users may create and share managed projects in the EMA and using the IDE, may create new content for managed projects, and also modify existing content of managed projects using objects in the AOS. In a system according to embodiments, the EMA infrastructure and the PDA infrastructure may be integrated such that managed projects and advanced applications in the EMA may be created, edited and modified using a PDA, where the PDA toolset may be synchronized with the Application Object Server (AOS) library in the EMA through the use of proxy items 206, 208. In such an integrated system, items in the AOS may be modified, created, and deleted using the PDA integrated system for designing and creating managed projects.

In an example embodiment a user may create a managed project 202 in a PDA, and proxy items 206, 208 may be generated in the PDA for the programmable objects in the EMA's Application Object Server (AOS) 212, such as for example, tables, forms, reports, classes, and enums. The proxy items may represent project items or objects from any managed project in an EMA and may appear in the PDA toolset, thus incorporating the PDA infrastructure with EMA compatible program languages and providing seamless project management. Proxy items 206, 208 provide a way for the PDA to access EMA objects and types from the EMA from within the PDA. The proxy items may link the PDA toolset to the EMA objects contained in the AOS 212 so that the PDA may use the EMA objects in a managed project. The proxy items may also contain the specific AOS path property 210 (or any unique identifier), where the code and type is stored in the AOS library 212, providing the specific location of the code for the object in the EMA. Using the AOS path property 210 for each proxy item 206, 208, the PDA may get the definitions of the EMA objects and types from the AOS, and may incorporate EMA language for controlling managed projects in the PDA that are compatible with the EMA. The EMA compatible code can be built or written behind the managed project in the PDA and it may be unnecessary for a user to manually input the code into the PDA.

As demonstrated in diagram 200, a managed project in the PDA may contain any number of proxy items 206, 208 from the EMA which may generate proxy files 204 and may be compiled into the managed project 202 in the PDA like managed code. It should be noted that the proxy pattern may also be used to generate unmanaged proxies (for example in a C++ project) or even to interpret any other programming language. The proxy items 206, 208 may allow a user to create and make changes to an EMA managed project using the PDA toolset, and the additions and changes may be automatically updated in the EMA language. A user may view the PDA toolset in a PDA command window, and the toolset may also include an EMA toolset displaying the proxy items. Since due to the integrated system, the PDA can recognize the EMA language through the use of the proxy items, it is unnecessary for a user to manually copy and paste the EMA code language into the PDA infrastructure, thus creating a seamless designing environment. Additionally, since the PDA and the EMA are wholly integrated, the PDA may automatically update the AOS library with object changes and additions made in the PDA framework, so that the managed projects are up-to-date with the latest modifications and newly created items. Likewise, the proxy items generated from the AOS library of objects may be automatically regenerated for use in the PDA toolset, ensuring that when an EMA object or project changes, the proxy items are up to date. The proxy items may be regenerated and updated only when changes, additions, or deletions are detected, ensuring smooth performance of the integrated system and avoiding bulk regeneration taking up running and functional space in the application. Since the integrated system pulls into the PDA all of the proxy items for creating and editing EMA projects in the PDA, and the proxy items may be continuously generated and updated in the AOS, a user does not have to generate the code manually in the PDA to program for EMA, and does not have to remember to regenerate the code every time a modification is made.

Figure 3:
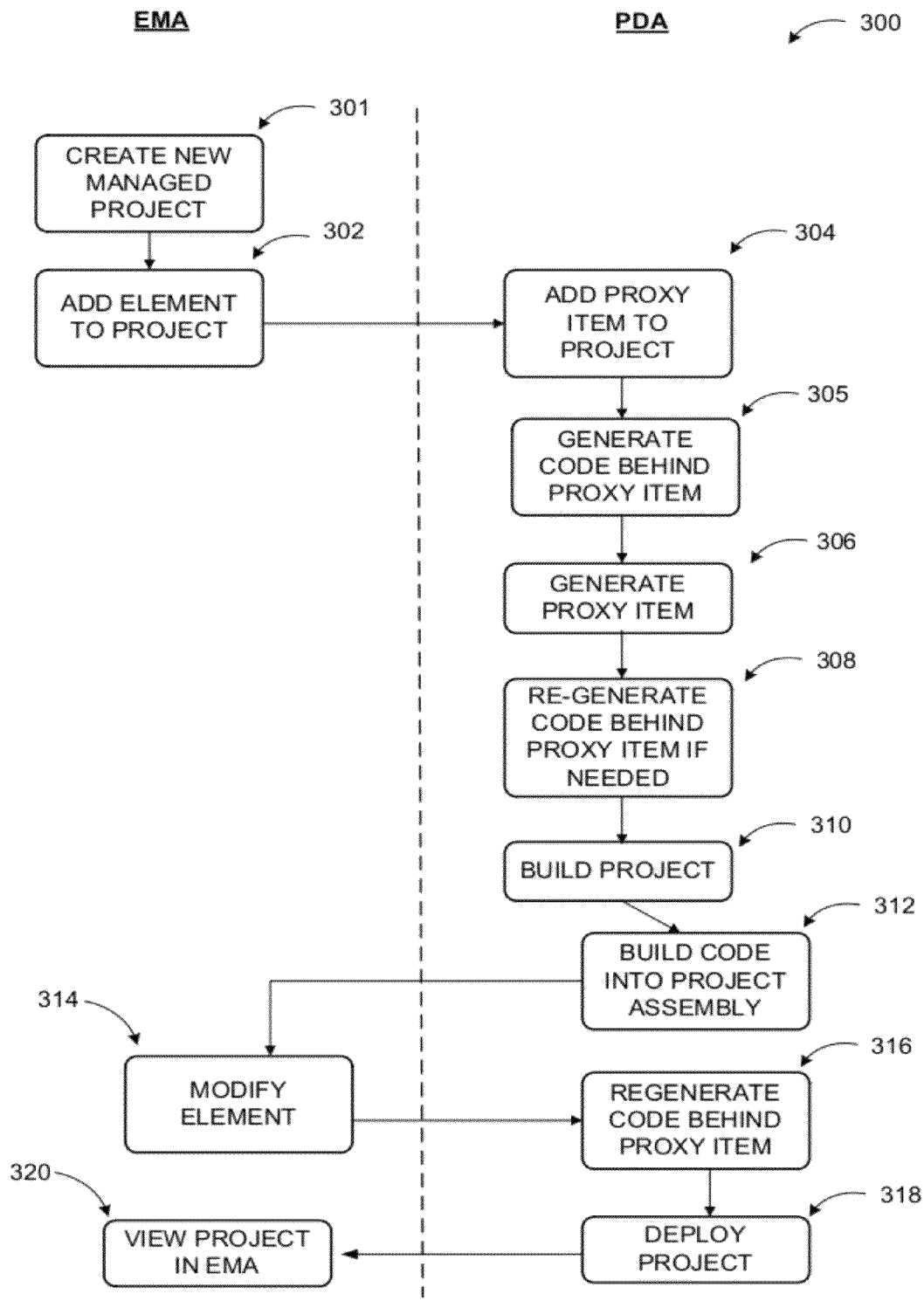
FIG. 3 demonstrates an example of an integrated system for generating proxy items.

FIG. 3 demonstrates an example of an integrated system for creating an EMA project using the PDA infrastructure. The EMA environment and the PDA environment may be aligned so that actions occurring in either environment function together creating a seamless project development environment. A user may create a new managed project 301, which is associated with the EMA through the AOS. The user may add EMA elements 302 to the project by dragging an EMA element into the project from the EMA toolset or by adding user controls available in the PDA toolset. Upon creation of the managed project 301, PDA may add proxy items to the project 304, generate the code behind each proxy item 305, and generate all of the proxy items 306 associated with a managed project for display in the PDA toolset. The generated proxy items may contain a unique identifier linking the proxy item to the code language in the EMA. The PDA may also re-generate the code behind each proxy item if needed 308. The PDA may then operate to build the project 310 creating a solution package file for the project which contains all of the proxy items and their associated unique identifier.

When the project is built, the code language may be generated 312 behind the project in the PDA and the project may be saved to the path specified by the unique identifier. The C# code may be built for the project with the associated proxy items and the code behind the project assembly file may be saved to the AOS in the location specified by the unique identifier for the project. During the creation and development of a managed project in the EMA, additional proxy items may be added to a project, or modified 314. When a proxy item in the managed project is created or updated, the system may automatically re-generate the proxy code 316 and update the code behind the proxy to the AOS. When the EMA project solution is built, the solution package file may contain the proxy item and the unique identifier for the project solution. The project may be deployed 318 and the solution file may be created, viewed, and installed on the local EMA server 320.

Figure 4:
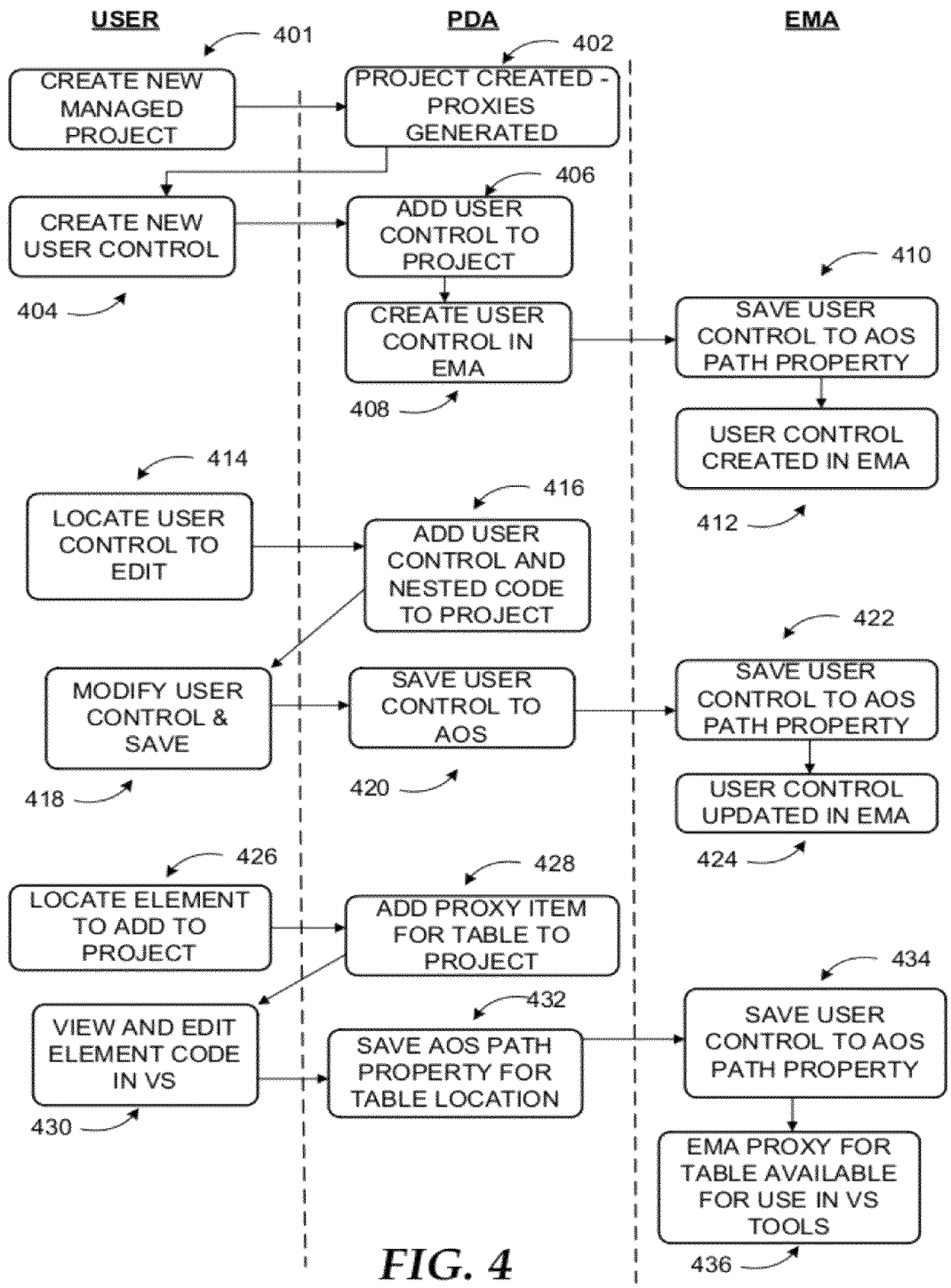
FIG. 4 demonstrates an example scenario of an integrated system for creating projects using a program development application.

FIG. 4 demonstrates an example scenario of an integrated system for creating an EMA project using the PDA infrastructure, according to embodiments. In a system according to embodiments, the tools integrated in the PDA for EMA development may provide a variety of functionalities. For example, the PDA integrated tools may allow a user to create an EMA project in the PDA, create one or more user controls in the PDA to add to the AOS in EMA, modify existing user controls, add EMA proxies to a managed project in the PDA, and customize style sheets in a project. In an example embodiment, a user may use the PDA to create a new user control for an EMA and add to the AOS. The user may begin by opening the PDA and creating a new managed project 401. In the toolset, the user may select the enterprise management group and create a new managed project 401. When a new managed project is created in the PDA 402, the PDA may automatically generate the proxy items associated with the managed project in the EMA, and make the proxy items available in the PDA toolset. The managed project may be synchronized with the AOS and the managed project may contain all of the proxies and css files for the managed project.

After the project has been created and the proxy items have been generated in the PDA toolset 402, the user may add a new user control item 404 to the project. The user may select a user control item template from the enterprise management toolset templates and add it to the project by dragging the user control into the project or selecting it for addition. The new user control and the code behind the file may then be added to the managed project in the PDA 406, and the system may create the new user control for the EMA 408. The new user control and the code behind the file may both contain a specific unique identifier when created in the PDA. The newly added user control and the code behind the file may be saved to the AOS 410 in the location specified by the unique identifier, and because of the optimized automatic synchronization and updating, any subsequent edits and save operations in the PDA may save the content of the code and the updated code behind the file into the specified AOS path location 410. As a result, the newly added user control may then be viewed in the AOS and the EMA 412 as an available operation user control and as a proxy item for use in the PDA.

In another example embodiment, a user may modify an existing user control that the user views in the AOS using a PDA. The user may begin by creating a new managed project 401. The user may locate the user control 414 that the user desires to edit in the PDA containing the proxy items of the EMA controls, and may add the user control to the managed project. The user control may be added to the project 416 and may appear as the user control with a nested code behind the file, where both the control and the code behind the control have a unique identifier pointing to their location in the AOS. Using the enterprise management toolset available in the PDA, the user may modify the user control 418 and modify the code behind the file. When the modified user control may be saved by the user, the modified user control and the code behind it may be saved on the disk 420 and also saved in the location specified by their AOS path property 422 (or any unique identifier) in the EMA, and also saved in the EMA layer that the user is set up to work in. Similarly, as described when creating a new user control, the modified user control may be viewed in the EMA toolbox as a proxy item and the user can view the AOS path property 424.

In a further example embodiment, a user may add EMA elements to a project control code by adding proxy items from the EMA into the control code in the PDA. The user may open a managed project 401 in PDA which is synchronized with the AOS. The user may locate an EMA element or item 426, such as table for example, that the user may desire to use in the PDA through proxy items. The user may add the item or table to the project and the integrated system in the PDA may add a proxy item 428 to the managed project, where the proxy item has a unique identifier pointing to the location of the table in the EMA. In the PDA the user may make changes to the element, e.g. the table, and the user may also view the code behind the proxy item for the table and may edit the code 430 using the tools available in the PDA. The user may save the element after making edits to the code behind and the code behind the table may also be saved with an AOS path property 432 pointing to the location of the table in the EMA.

The EMA element may be saved in the EMA to the AOS by an AOS path property 434 for use in project development in the PDA as a proxy item. Further, when the user wishes to view the project with the added proxy items in the project, the user may execute an operation to build the project, and during the build the proxy items for the newly added user control or the table, for example, may be generated and compiled into the managed project and synchronized with the unique identifier for the project and the project user controls. Upon a successful build of the project, the system may execute deploy on the project and all of the managed items in the project may be updated in the AOS and the project may be viewable in an EMA platform such as over a web browser or over a user interface in a collaborative environment.

In an additional embodiment, a user may customize the style sheets using the integrated system. The user may locate a style sheet file in the EMA toolset and its unique identifier. In the PDA the user may add the style sheet file to a managed project, open the style sheet file and edit the style sheets. After editing, the style sheets may be saved to the managed project and both project and the style sheet file may be saved to the path specified in the respective unique identifier. During a build and deploy of the managed project, the style sheets are compiled into the managed project and deployed such that the project may be viewable in an EMA application. As described in previous examples, the style sheets represented by proxy items may also be automatically updated with changes and modifications such that a proxy item generated for a particular EMA element may be the most current version of the code and style sheets.

The examples in FIG. 1-4 have been described with specific elements, configurations, and scenarios. Embodiments are not limited to systems according to these example configurations. Providing an integrated environment for seamless development and management of Enterprise Management Applications using a Program Development Application infrastructure may be implemented in configurations using other types of elements, scenarios, and configurations in a similar manner using the principles described herein.

Figure 5:
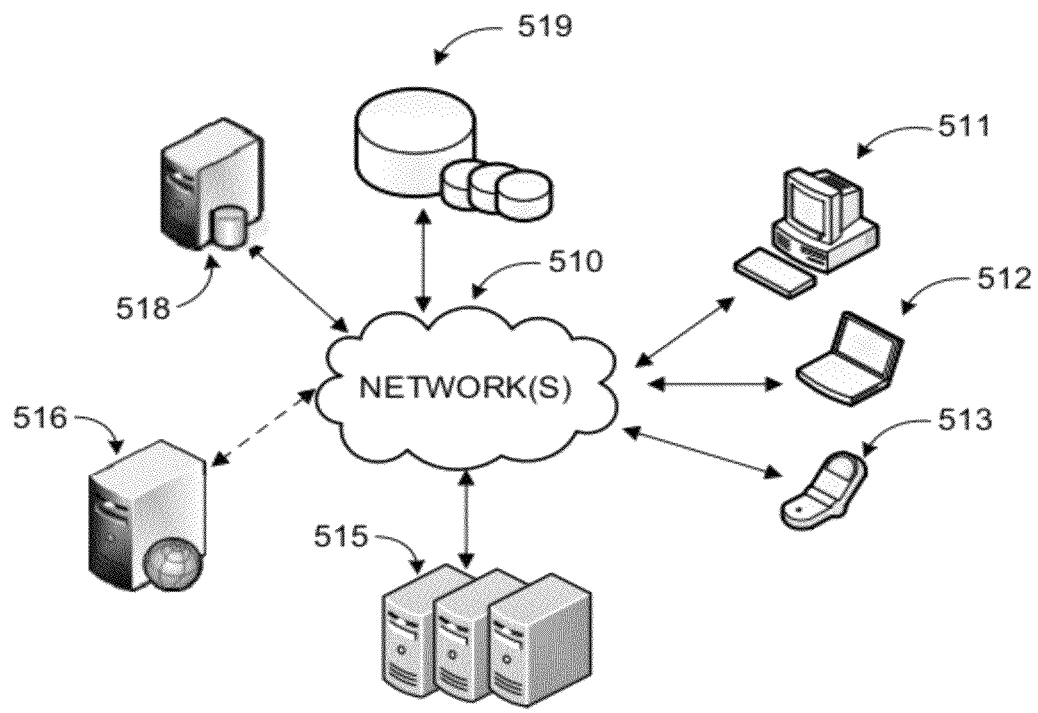
FIG. 5 is a networked environment, where an integrated system according to embodiments may be implemented.

FIG. 5 is an example networked environment, where embodiments may be implemented. A system providing an integrated environment for seamless development and management of Enterprise Management Applications using a Program Development Application infrastructure may be implemented via software executed over one or more servers 516 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A configuration application executed on one of the servers may facilitate generating proxy items for the integration of an EMA with a PDA. The application may enable users to create an EMA managed project using the PDA infrastructure and may facilitate the generation of proxy items for use in the PDA framework for developing and modifying managed projects and may perform automatic updates to proxy items when modifications have been made. The integrated system may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing an integrated system for seamless project management through the use of proxy items. Furthermore, the networked environments discussed in FIG. 5 are for illustration purposes only. Embodiments are not limited to the example applications, modules, or processes.

Figure 6:
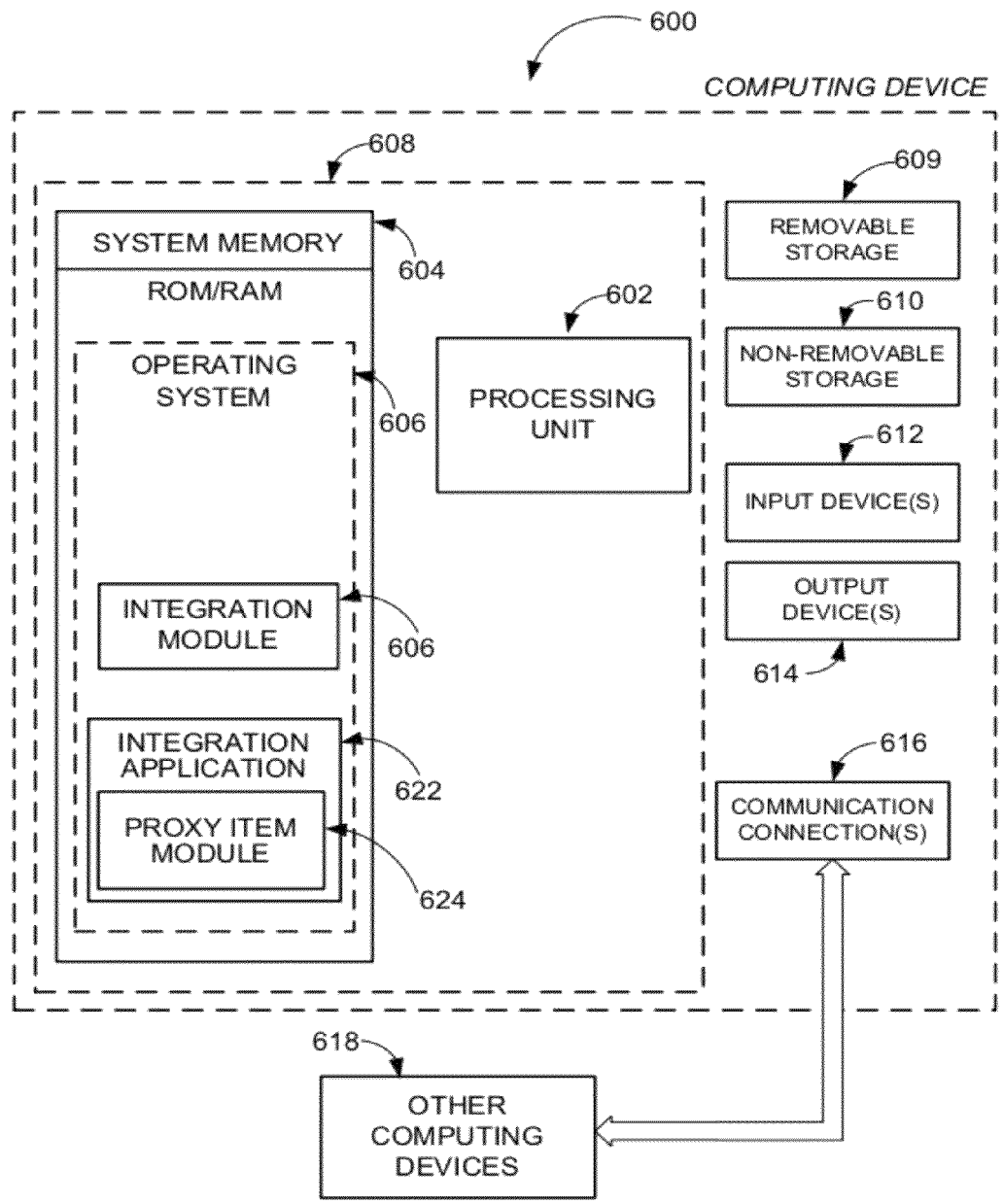
FIG. 6 is a block diagram of an example integrated system environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of providing an integrated environment for seamless development and management of Enterprise Management Applications using a Program Development Application infrastructure and generating proxy items according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS® operating systems from MICROSOFT CORPORATION of Redmond, Wash. The system memory 604 may also include one or more software applications such as integration modules 606, integration application 622, and proxy item module 624.

Integration application 622 may enable users to create, develop and modify an EMA managed project using the PDA infrastructure. Through a user interface controlled by proxy item module 624, application 622 may generate proxy items and may display available tools for developing and modifying EMA managed projects in the PDA environment. The proxy item module may generate proxy items for all EMA objects and elements contained in the Application Object Server in the EMA and provide the proxy items in the PDA toolset for use in developing, creating, and modifying EMA managed projects in a PDA. Integration application 622 and proxy item module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
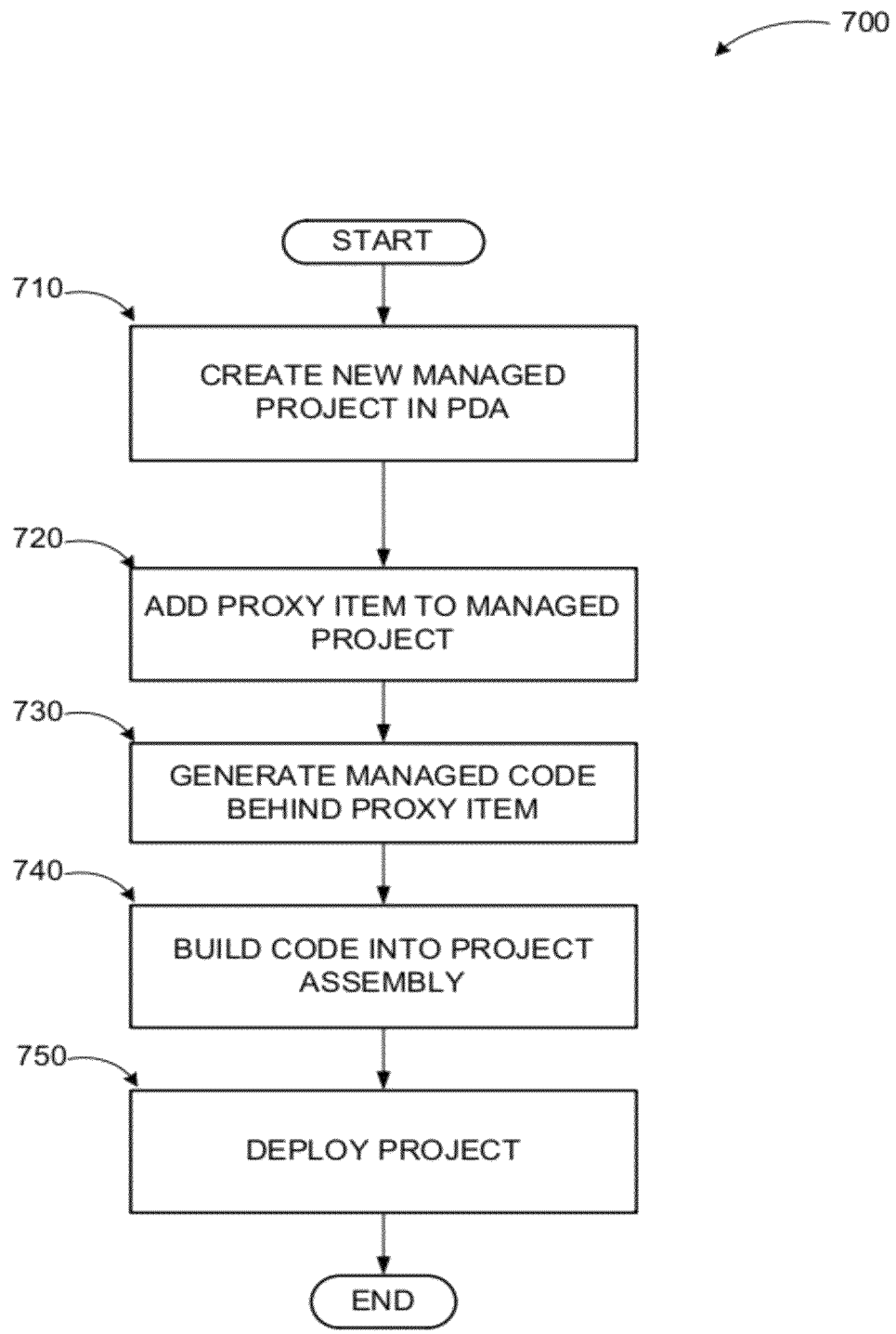
FIG. 7 illustrates a logic flow diagram for a process of providing proxy items in an integrated system according to embodiments.

FIG. 7 illustrates a logic flow diagram for process 700 of providing an integrated system for developing EMA projects and generating proxy items for use in the PDA toolset. Process 700 may be implemented on a server or other computing device.

Process 700 begins with operation 710, where a new managed project may be created in a Project Development Application. The managed project may be associated with the EMA through the AOS. Proxy items may contain the AOS path linking the proxy item to the code language in the EMA. The proxy items may appear in the PDA toolset as managed code artifacts representing the EMA managed code contained in the AOS. At operation 720, a proxy item for a user control may be added to the managed project. The user control for the proxy item may be added to the project and may contain a unique identifier pointing to a specific location in the AOS. At operation 730, the code behind the proxy item may be generated. The user control and the code behind the file for the user control may be added to the managed project, and both the control and the code may contain the unique identifier pointing to the EMA user control in the AOS. At operation 740, the project may be built and the code may be built into the project assembly. The code (e.g., C# or C++ code) may be built for the project with the associated proxy items and the code behind the project assembly file may be saved to the AOS in the location specified by the unique identifier for the project. At operation 750, upon successful build of the project, the system may execute to deploy the project and the project may be viewable in an EMA application such as for example over a web browser.

The operations included in process 700 are for illustration purposes. Providing an integrated system for developing EMA projects and generating proxy items for use in the PDA toolset may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing an integrated system for seamless project management between a program development application and an enterprise management application, the method comprising:
   connecting to an application object server for the enterprise management application, wherein the application object server provides a source code for one or more objects included in the application object server and a user edits the source code using an integrated development environment that includes tools designated for designing code, editing code, compiling code, and debugging code;
   retrieving definitions for elements and object types from the application object server;
   generating proxy items representing coded object types and elements from the application object server, wherein the proxy items include an application object server path property for where the code and type for the one or more objects is stored in an application object server library;
   automatically generating managed code for the proxy items of the elements and object types from the application object server;
   displaying the proxy items in a toolset for the program development application;
   synchronizing the proxy items in the toolset for the program development application with the application object server;
   automatically updating the application object server library with object changes, deletions, and additions made within the program development application employing the toolset; and
   automatically regenerating the proxy items with the updated application object server at the toolset for the program development application.

2. The method of claim 1, further comprising:
   enabling a user to create projects for the enterprise management application in the program development application using the toolset provided by the program development application; and
   saving the projects to the application object server for the enterprise management application.

3. The method of claim 1, further comprising:
   designating an identifier to each proxy item and managed code for each proxy item for directing to the proxy item's specific location in the application object server.

4. The method of claim 1, further comprising:
   enabling a user to create a new user control element for the enterprise management application using the toolset provided by the program development application.

5. The method of claim 1, further comprising:
   enabling a user to modify an existing user control element for the enterprise management application using the toolset provided by the program development application.

6. The method of claim 5, further comprising:
   automatically saving user control element modifications to the proxy item for the user control element in the application object server at a location designated by a unique identifier for the proxy item.

7. The method of claim 5, further comprising:
   automatically regenerating the proxy items in the program development application when changes are detected in the enterprise management application.

8. The method of claim 1, further comprising:
   enabling a user to create a proxy item in the program development application from one of an element and object type in the enterprise management application.

9. The method of claim 1, further comprising:
   enabling a user to customize style sheets for a project contained in the enterprise management application.

10. The method of claim 1, wherein a project created in the program development application includes a plurality of proxy items for elements and objects linking the project to the enterprise management application.

11. The method of claim 1, further comprising:
    enabling a user to modify the managed code for the proxy items through the program development application; and
    saving the proxy item and the managed code for the proxy item to the application object server.

12. The method of claim 1, further comprising:
    building and deploying a project in the program development application, wherein deploying the project causes the project to be saved in the application object server and renders available for use in the enterprise management application.

13. A server for providing an integrated system for seamless project management between a program development application and an enterprise management application, comprising:
    a memory storing instructions;
    a processor coupled to the memory, the processor executing an integration application, wherein the integration application is configured to:
       connect to an application object server for the enterprise management application, wherein the application object server provides a source code for one or more objects included in the application object server and a user edits the source code using an integrated development environment that includes tools designated for designing code, editing code, compiling code, and debugging code;
       retrieve definitions for elements and object types from the application object server, wherein the coded object types include one or more of: a table, a form, a report, a class, and an enum;
       generate proxy items representing coded object types and elements from the application object server at a proxy item module, wherein the proxy items include an application object server path property for where the code and type for the one or more objects is stored in an application object server library;

automatically generate managed code for the proxy items of the elements and object types from the application object server;

display the proxy items in a toolset of the program development application employing the proxy item module;

designate a unique identifier to each proxy item and the managed code for each proxy item for directing to a proxy item's specific location in the application object server;

synchronize the proxy items in the toolset for the program development application with the application object server;

automatically update the application object server library with object changes, deletions, and additions made within the program development application employing the toolset; and automatically regenerate the proxy items with the updated application object server at the toolset for the program development application.

14. The server of claim 13, wherein the integration application is further configured to automatically save user control element modifications of each proxy item to the application object server at a location designated by a unique identifier for the proxy item.

15. The server of claim 13, wherein the integration application is further configured to automatically regenerate the proxy items in the program development application when changes are detected in the enterprise management application.

16. The server of claim 13, wherein the integration application is further configured to enable a user to create projects for the enterprise management application in the program development application using the toolset provided by the program development application and save the projects to the application object server of the enterprise management application.

17. The server of claim 13, wherein the integration application is further configured to enable a user to debug a project in a project development application before deploying the project for use in the enterprise management application.

18. The server of claim 13, wherein the integration application is further configured enable a user to perform at least one from a set of: creating a new user control element, creating a new proxy item, modifying existing user control elements and proxy items in the program development application from an element or object type in the enterprise management application.

19. A computer-readable storage medium with instructions stored thereon for providing an integration system for seamless project management, the instructions comprising:

connecting to an application object server of an enterprise management application;

retrieving definitions for elements and object types contained in the application object server;

generating proxy items representing coded object types and elements from the application object server, wherein the proxy items include an application object server path property for where the code and type for the one or more objects is stored in an application object server library;

automatically generating managed code for the proxy items of the elements and object types from the application object server;

displaying the proxy items in a toolset for the program development application;

designating a unique identifier to each proxy item and the managed code for each proxy item for directing to a proxy item's specific location in the application object server;

synchronizing the proxy items in the toolset for the program development application with the application object server;

enabling a user to create projects for the enterprise management application in the program development application using the toolset provided by the program development application;

automatically updating the application object server library with object changes, deletions, and additions made within the program development application during project creation employing the toolset;

automatically regenerating the proxy items with the updated application object server at the toolset for the program development application; and deploying the projects to the enterprise management application.

20. The computer-readable storage medium of claim 19, wherein the instructions further comprise:

enabling the user to modify an existing proxy item and the managed code for the proxy item through the program development application and to save the proxy item and the managed code for the proxy item to the application object server.

* * * * *